6116X
T. Cunningham.
Camel and Floating Dock.
Patented Oct. 1, 1830.
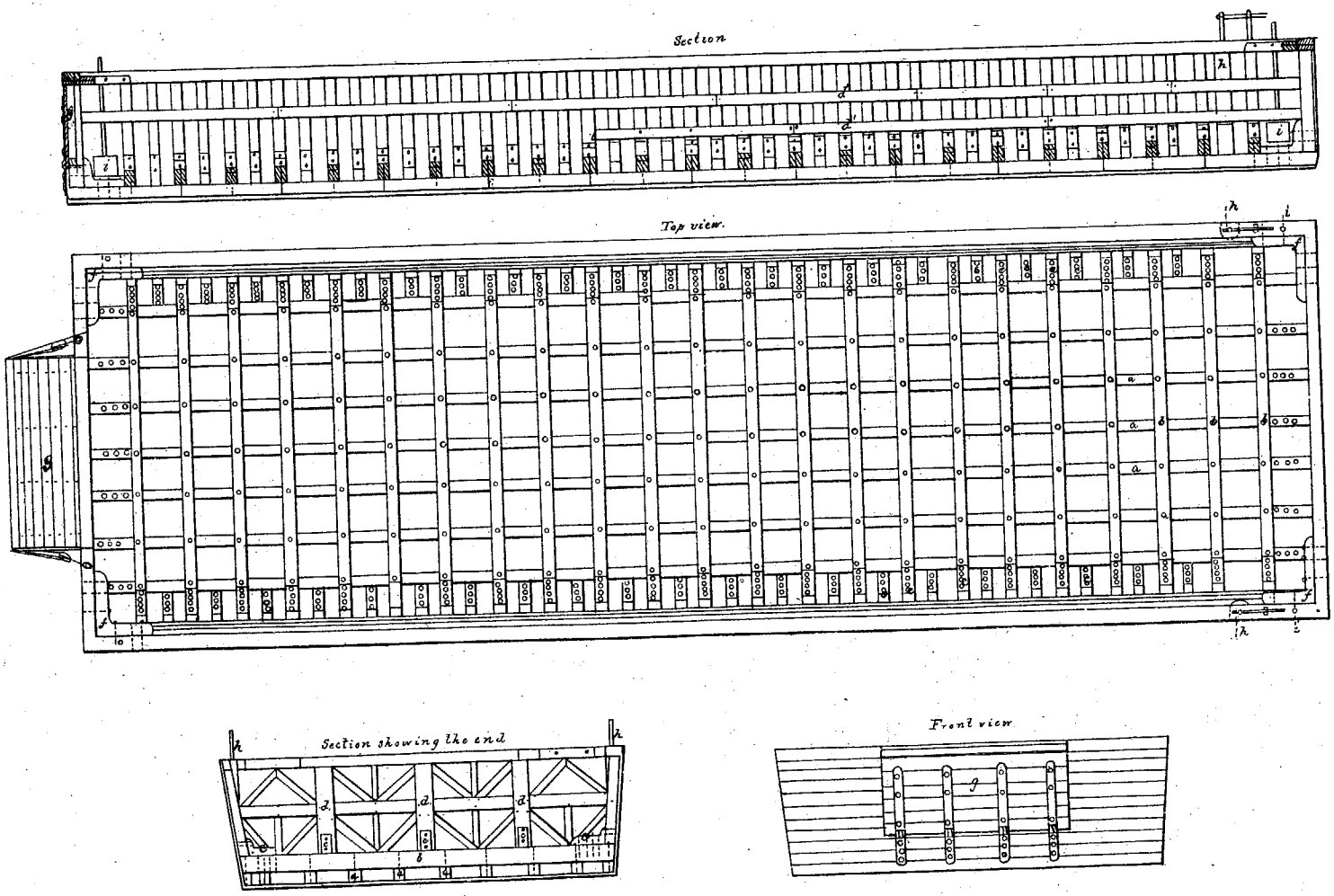
N. PETERS, PHOTO-LITHOGRAPHER, WASHINGTON, D. C.

Oct. 1. 1830 6116X 507

Thomas Cunningham of Pittsburg Penn

Letters Patent

The Schedule referred to in these Letters Patent and making part of the same; containing a description in the words of the said Thomas Cunningham him self of his improvement, being a machine called the "Pittsburg Graving Dock"

To all persons to whom these presents shall come. I Thomas Cunning ham of the City of Pittsburg, County of Allegheny and State of Pennsylvania Ship Carpenter and Freeling. I have Invented Constructed made and ap plied to use a new and useful improvement discovery and machine called "The Pittsburg Floating Graving Dock. The following Specification shews the manner of its construction, its use, and the application of its machinery for building or repairing Ships, Steam Boats, and any other craft fit for Navigable purposes viz. The Pittsburg Floating Graving Dock is in the form of a square vessel made of wood 140 feet long, 34 feet wide at bottom 36 feet wide at the top and 10 feet deep, but which size may be varied agreeably to the size of vessels which it is intended should be either built or repaired therein. The bottom is constructed of 2 tiers of timbers. The first or lower set running longitudinally spaced off at about 4 feet apart so as to answer the breadth of bottom. over these are cross or lateral beams at the distance of 6 feet apart bolted down on the lower timbers and well tied by knees to the sides of the vessel. On the cross timbered frame or floor, the vessel to be built or repaired must be blocked and braced up at a proper height to allow her graving to be done with ease to the workman.
The ends of the vessel are framed together with king posts, braces and girders and secured to the sides by strong knees. The sides are composed of a num ber of uprights about 3 feet apart framed into the lower longitudinal beams, and secured at top and between it and the bottom by 2 strong wall pieces which go round the dock; The bottom is covered with 2 and one half inch and the sides with 2 inch plank; on one end a gate is framed to open and shut at an elevation of about 4 feet above the bottom and made of sufficient width to admit in or out of the dock

[illegible]

10/1/1830 [illegible]

such vessels as may have occasion to use it. It is hung on its lower horizon-
-tal edge by large strap hinges and joints are made water tight by means of
leather and leaded joints and is raised or let fall by means of ropes
with tackles and pulleys. The 2 pumps are constructed on the end opposite
to that where the gate is placed and scuttle holes are provided in each
angle of the dock. To use this graving dock it must be sunk in
whatever water it is moored. The gate must be thrown open and the
vessel to be repaired warped into her. The gate is then closed. the pumps
geared to the steam engine and in a short time she will be dry in-
side and again afloat with the vessel to be repaired braced up in
her stocks. after building or repairing is completed the scuttle
holes are opened and the floating Graving Dock sunk the gate thrown
open and the vessel built or repaired floats off and immediately
after another vessel is warped in for repair and the foregoing op-
eration goes on in regular succession as business may require Witnesses
M. B. Lowrie }
[illegible] W. W. Waterman. } Thos Cunningham 564 words (Patented 1 October, 1830)